UNITED STATES PATENT OFFICE.

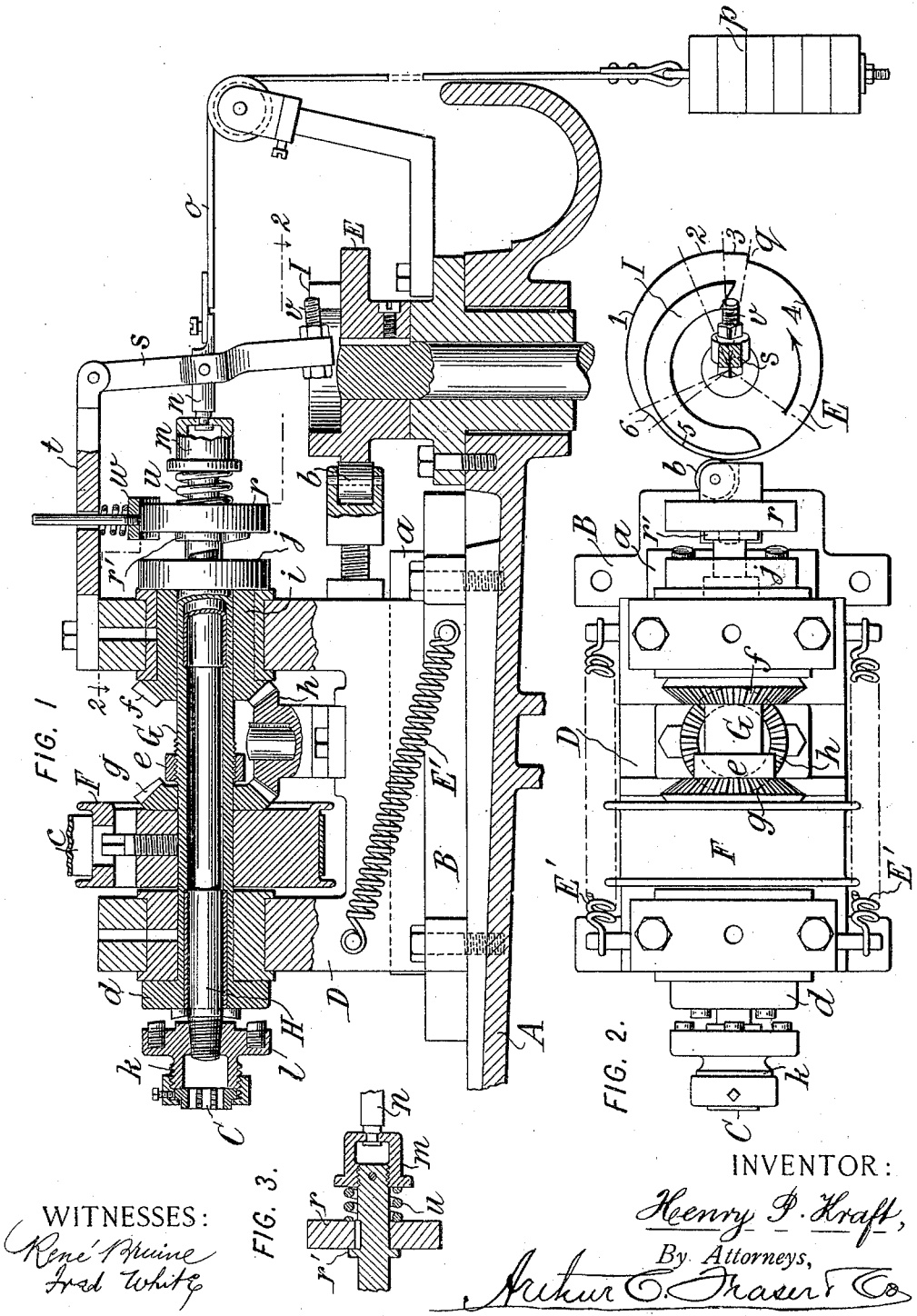

HENRY P. KRAFT, OF NEW YORK, N. Y., ASSIGNOR TO A. SCHRADER'S SON, INCORPORATED, OF NEW YORK, N. Y., A CORPORATION OF NEW YORK.

THREAD-CUTTING MECHANISM.

986,724.         Specification of Letters Patent.     Patented Mar. 14, 1911.

Application filed August 12, 1904. Serial No. 220,445.

*To all whom it may concern:*

Be it known that I, HENRY P. KRAFT, a citizen of the United States, residing in the borough of Manhattan, city, county, and State of New York, have invented certain new and useful Improvements in Thread-Cutting Mechanism, of which the following is a specification.

This invention relates to thread-cutting mechanism, and aims to provide certain improvements therein.

In devices for cutting screw-threads or for forming a spiral groove of any description it is practically essential that a relative longitudinal movement of the die and work be maintained while the rotary cutting movement is taking place, and that these two movements be reversed at the end of the operation, so that the die and work can be separated.

My invention provides a mechanism in which such movements are automatically effected, and which is positive and efficient in its action.

The preferred embodiment of my invention is illustrated in the accompanying drawings, in which—

Figure 1 is an elevation, partly in longitudinal vertical section, showing the device as applied to the table of a metal working machine, such as a lathe, and Fig. 2 is a view partly in plan with the table omitted, and partly in section on the line 2—2 in Fig. 1. Fig. 3 is a sectional view of a detail.

Referring to the drawings, let A indicate any suitable support for the device, that shown being a portion of the table of a turret lathe, the bed plate B of the device being bolted thereto, as shown. In the present construction I prefer that the work shall be held in a stationary position and that the die or other cutting device shall be rotatable, although this is not essential. I also prefer that the necessary relative longitudinal movement of the work and die shall be effected by giving the latter a forward and backward movement as it rotates, although this also is not essential. To this end the die C is mounted with its appurtenances upon a slide D which is guided in its movements upon the bed B by a guide $a$, a rotary cam E being provided for imparting the forward movement to the slide, and springs E' for returning it to its rearward position.

The cam E with its shaft is mounted in bearings on the table A, and acts against a roller $b$ which is adjustably connected to the rear end of the slide.

Rotary motion is imparted to the device by a pulley F, which is driven by a belt $c$. The pulley F is fixed to a hollow shaft G, which carries at its outer end a clutch head $d$, and at its middle a nut $e$, these parts being so formed as to prevent any considerable endwise movement of the shaft in either direction. By this construction the clutch head $d$ is constantly driven in one direction, while a bevel gear $f$ loose upon the shaft G is constantly driven in the opposite direction through the medium of gears $g$ and $h$, in a well known manner. The reversing gear $f$ is provided with a hub $i$, which has fixed to it a clutch head $j$, rotating reversely to the clutch head $d$.

The die C (which may be any suitable screw-threading, tapping or other cutting tool) is carried in a chuck $k$, which has formed upon it a clutch head $l$, and which is carried by a shaft H, the latter extending completely through the hollow shaft G and hub $j$. At its rear end the shaft H carries a cap $m$, to which is swiveled a rod $n$, connected by means of a strap $o$ with a weight $p$. The latter normally holds the tool shaft H in its rearward position in the hollow shaft G on the slide B, with the clutch heads $d$ and $l$ engaged, so that the shaft is driven in a forward direction, whether the slide B is at rest or is moving forwardly during the cutting of the thread. In such forward movement (which is imparted to the slide by cam E as before stated) the weight $p$ is raised slightly, but still exerts its stress upon the shaft H.

A clutch head $r$ is splined to the tool shaft and is prevented from moving in a forward direction by a collar $r'$ on the shaft. It is held yieldingly in its forward position by means of a spring $u$ between the clutch head and the cap $m$. Just before the thread is finished the slide-advancing segment 1 of the cam is replaced by a circular segment 2, during the movement of which there is no forward movement of the slide. The tool however continues to rotate, and by reason of its engagement with the threads already formed, advances continually, so that it carries the clutch pins of the head $l$ to the edge of the clutch pins on the head *d*. Thereupon the segment 3 of the cam comes into operation, this being a circular segment of slightly less radius (1/64th of an inch in practice) than that of the segment 2; this segment permitting a corresponding retirement of the slide, so that the clutch heads *d* and *l* are cleared by a very slight space, and the clutch heads *r* and *j* are held clear by the same distance. The main shaft G then runs free during the passage of this segment of the cam. The cam then drops by a shoulder *q* to the segment 4, allowing the slide to retreat until the clutch head *j* comes into engagement with the clutch head *r* and rotates the tool shaft in the backward direction.

In order that the change from the forward to the backward direction of rotation may be made quickly, it is important to stop the continued forward rotation of the tool due to its momentum. Otherwise the sudden engagement of the rear clutch heads *r* and *j* has been found to result in the breaking of numerous clutch pins. For this purpose a brake *w* is preferably provided which presses with a spring action on the clutch head *r*. This brake may serve the same purpose in changing from a backward to a forward rotation, where this change is to be made quickly. During the operation of the segment 4 of the cam, the slide retreats at substantially the same rate of speed as the tool unscrews itself from the work, so as to prevent any strain on the threads or on the work. At the same time the cam I engages the adjustable bolt *v* on the end of the lever *s* pivoted to the fixed support *t*, and by means of the strap *o* lifts the weight *p* so as to free the tool shaft from the strain of this weight. The shape of the working face of the cam I is such as to gradually release the weight and allow it to pull the clutch head *r* backward. Shortly after the tool has entirely unscrewed itself from the work, the cam reaches the position shown in the drawings. The lever *s* is released and the weight withdraws the clutch head *r* from engagemen with the head *j* and brings the heads *d* and *l* into engagement so as to recommence the forward rotation of the tool. There is a segment 5 of the cam which comes into operation shortly before this and which holds the slide at rest. The length of this segment, which is circular, will depend upon the time necessary to present a new blank to the tool, or upon various other considerations. At the end of this period of rest, the segment 6 comes into operation, forcing the slide forward quickly until it engages the work, after which the segment 1 forces it forward gradually at the same rate as that at which the thread is cut and the operations previously described are repeated.

For clearness I have shown in Fig. 1 the shaft H in an intermediate position, in which neither of the clutches are in engagement with it, the bolt *v* being shown as just passing off the cam I.

Although I have described in detail the preferred embodiment of my invention it will be understood that I do not wish to be limited thereto, as the construction shown is susceptible of considerable modification without departing from my invention.

I claim:—

1. In a screw-threading device, the combination of a slide, reversing mechanism carried thereby, a shaft mounted in said slide and adapted to be moved relatively thereto to engage said mechanism to cause it to rotate said shaft in one direction, a clutch adapted to engage said shaft to said mechanism to cause said shaft to rotate in the reverse direction, tension means for holding said shaft in its rearward position in said slide during the forward movement of the slide, and means for rendering such tension means ineffective during the rearward movement of said slide.

2. In a screw-threading device, the combination of a reciprocating tool, means for effecting a forward rotation thereof, a clutch adapted to connect said tool with said rotating means, means for reversely rotating the tool, means for connecting the tool therewith, and a cam for controlling the reciprocation of said tool, having an abrupt fall adapted to quickly disconnect said clutch, and a succeeding gradual fall to separate the tool from the work.

3. In a screw-threading device, the combination of a reciprocating tool, means for effecting a forward rotation thereof and then a backward rotation, clutches adapted to connect said tool with said rotating means, a cam adapted to control the movement of said tool toward the work to thread the latter, and away from the work to separate it therefrom, said cam having an abrupt fall to disconnect one of said clutches at the end of the forward rotation of said tool, and a succeeding gradual fall to separate the tool from the work, and a brake applied to the tool shaft and adapted, during the period between such abrupt fall and such gradual fall to descrease the speed of the latter.

4. In a screw-threading device, the combination of a slide B, a shaft G rotatable therein, a clutch head D at the forward end of said shaft, a gear *f*, means for rotating it in a direction opposite to that of said shaft G, a clutch head *j* connected to said gear *f*, a shaft H passing through said shaft G and movable longitudinally therein, a clutch head *l* on the forward end of said shaft H adapted to engage said clutch *d*, a clutch head *r* at the rear end of said shaft H, and adapted to engage said clutch head *j*, a rod *n*, swiveled to the rear end of the shaft H, a weight *p* connected to said rod *n*, a lever *s* connected to said rod $n$, a cam E for reciprocating said slide B and causing said clutch heads $l$ and $d$ to engage, and a cam I for moving said lever $s$ and holding up said weight $p$.

5. In a screw-threading device, the combination of a reciprocating tool, a reversing mechanism, clutches adapted to alternately connect said tool with the forwardly and backwardly rotating elements of said reversing mechanism, and a cam for controlling the operation of said clutches, said cam having an abrupt fall to control the disconnection of one clutch, a dwell to permit free movement of the shaft, a second abrupt fall to control the disconnection of the second clutch, and a gradual fall to permit the separation of the tool from the work.

6. In an automatic screw-threading device, the combination of a reciprocating tool, means for effecting a forward rotation thereof, means for effecting a backward rotation thereof, such rotating means being timed so as to permit the tool to run freely at each change of direction of rotation, and a brake applied to the tool and adapted to stop the tool or decrease its speed during its free period.

In witness whereof, I have hereunto signed my name in the presence of two subscribing witnesses.

HENRY P. KRAFT.

Witnesses:
EUGENE G. MYERS,
THEODORE T. SNELL.

---

Copies of this patent may be obtained for five cents each, by addressing the "Commissioner of Patents, Washington, D. C."